(No Model.)

F. LINDNER.
MEAT CUTTING MACHINE.

No. 334,789. Patented Jan. 26, 1886.

6 Sheets—Sheet 1.

Witnesses:
O. W. Bond
H. T. Jones

Inventor:
Ferdinand Lindner (No Model.) 6 Sheets—Sheet 3.

F. LINDNER.
MEAT CUTTING MACHINE.

No. 334,789. Patented Jan. 26, 1886.

Witnesses: Inventor:
O. W. Bond Ferdinand Lindner
H. T. Jones

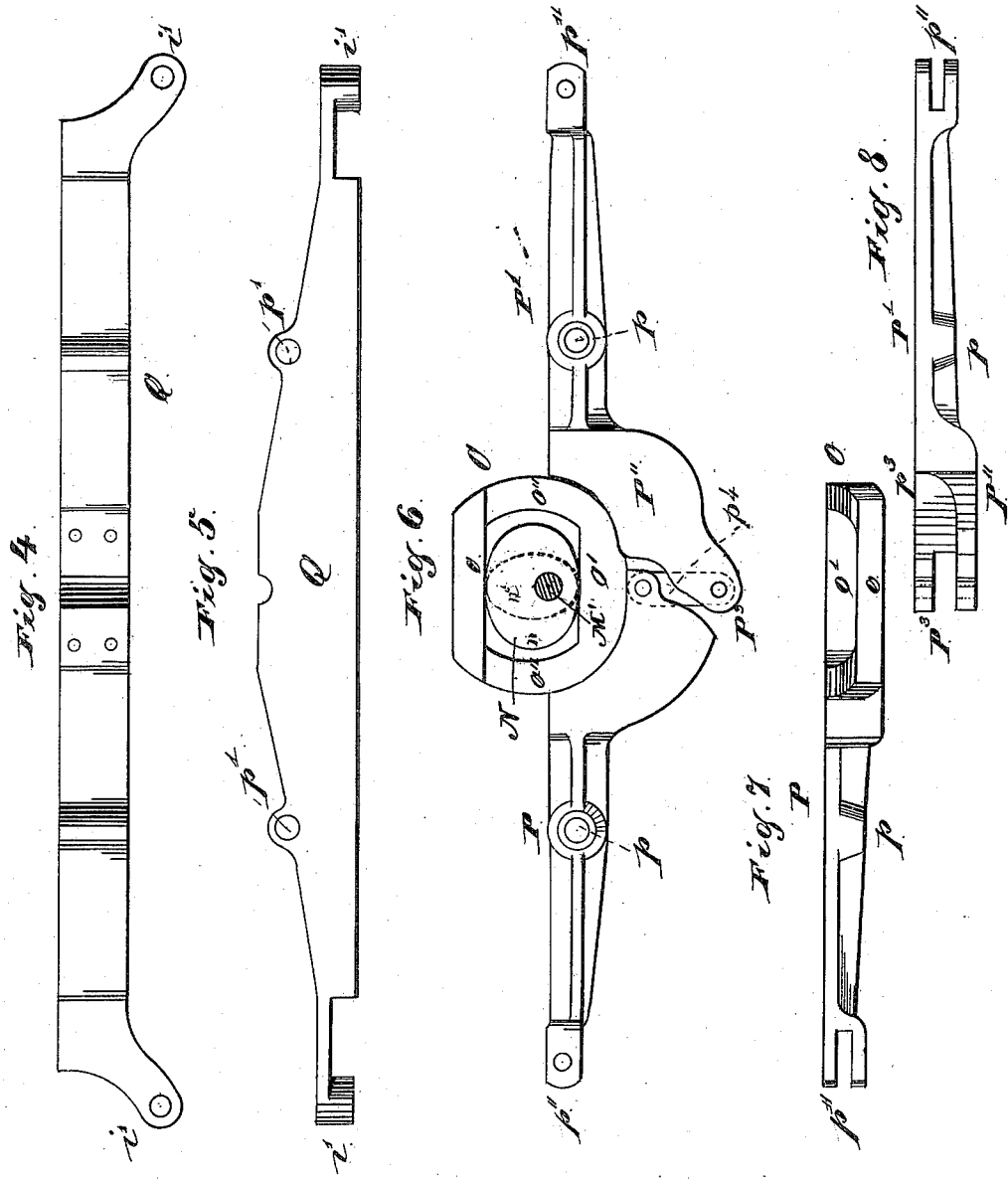

(No Model.)  6 Sheets—Sheet 5.
F. LINDNER.
MEAT CUTTING MACHINE.
No. 334,789. Patented Jan. 26, 1886.
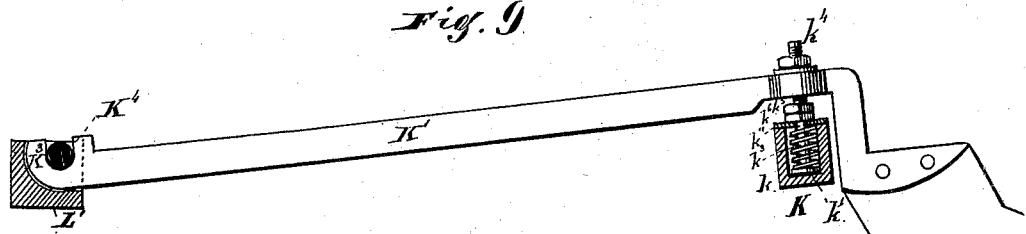
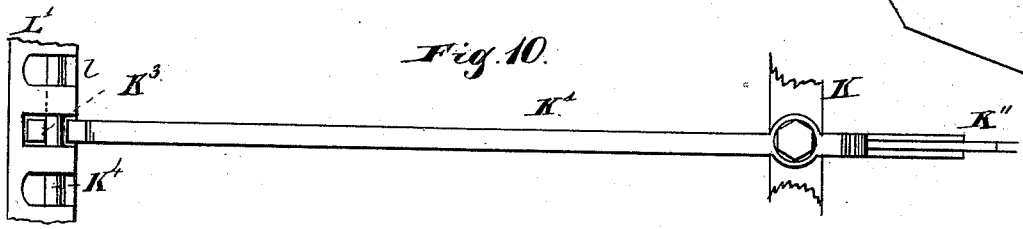
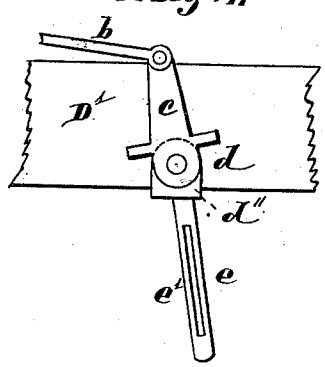
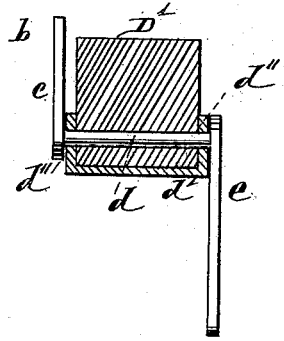
Witnesses:
Inventor:
Ferdinand Lindner (No Model.) 6 Sheets—Sheet 6.

F. LINDNER.
MEAT CUTTING MACHINE.

No. 334,789. Patented Jan. 26, 1886.

Witnesses: Inventor:
O. W. Bond Ferdinand Lindner
H. T. Jones

UNITED STATES PATENT OFFICE.

FERDINAND LINDNER, OF CHICAGO, ILLINOIS, ASSIGNOR TO HIMSELF, EDWARD MELCHIOR, JULIUS CLEMENS, AND CHARLES FINKENSIEPER, ALL OF SAME PLACE.

MEAT-CUTTING MACHINE.

SPECIFICATION forming part of Letters Patent No. 334,789, dated January 26, 1886.

Application filed July 19, 1884. Serial No. 138,273. (No model.)

*To all whom it may concern:*

Be it known that I, FERDINAND LINDNER, residing at Chicago, in the county of Cook and State of Illinois, and a citizen of the United States, have invented new and useful Improvements in Meat-Cutting Machines, of which the following is a full description, reference being had to the accompanying drawings, in which—

Figure 1:
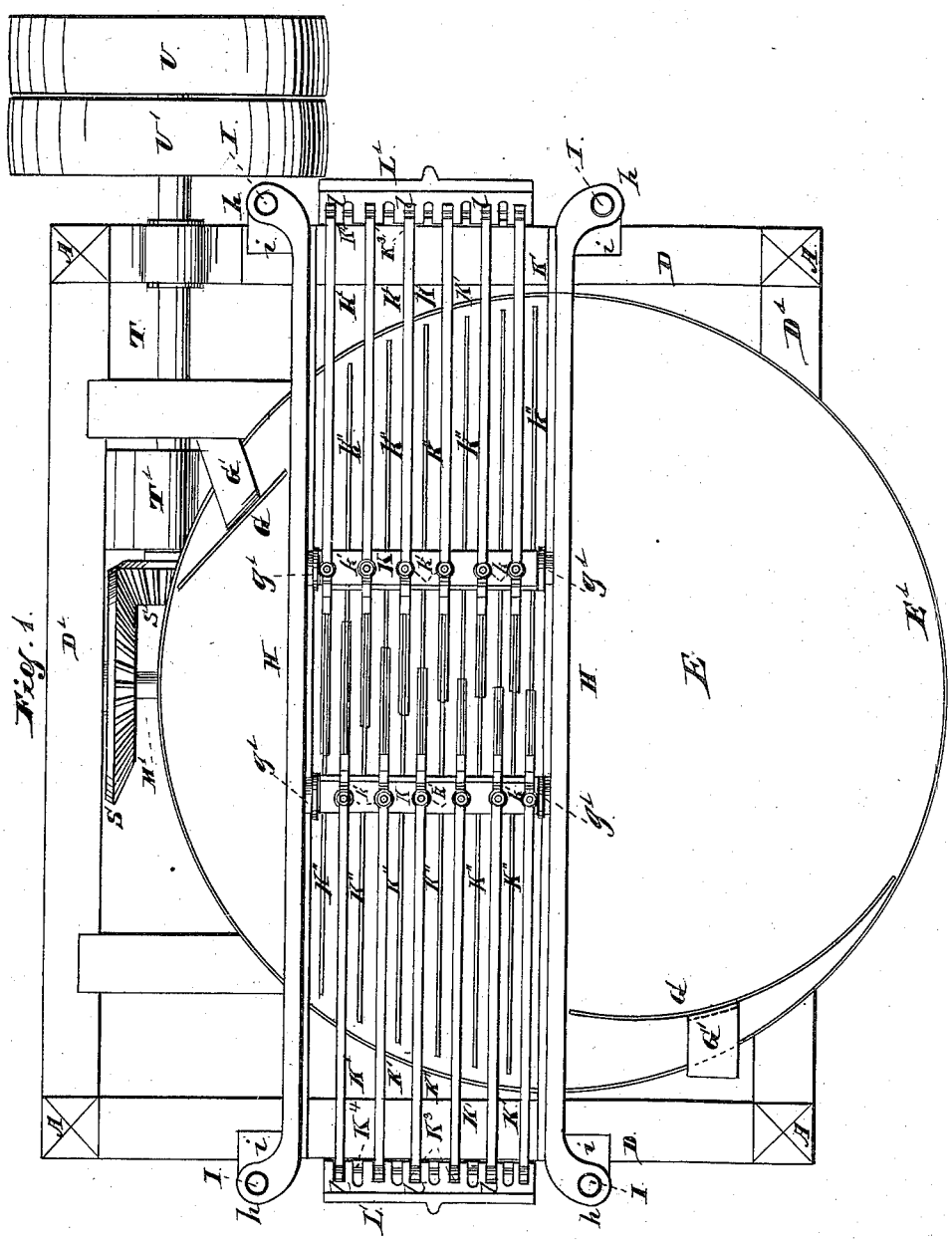
Figure 2:
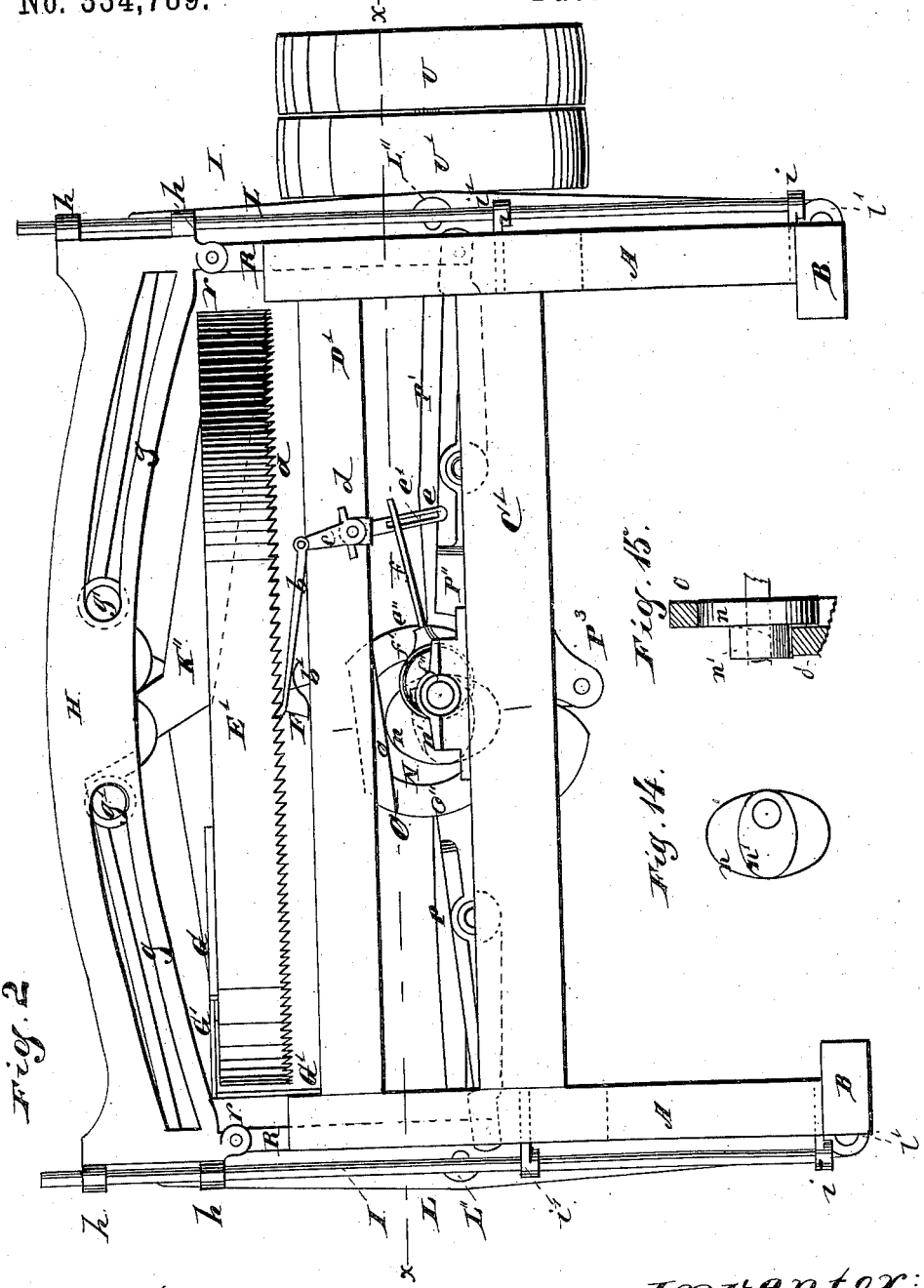
Figure 3:
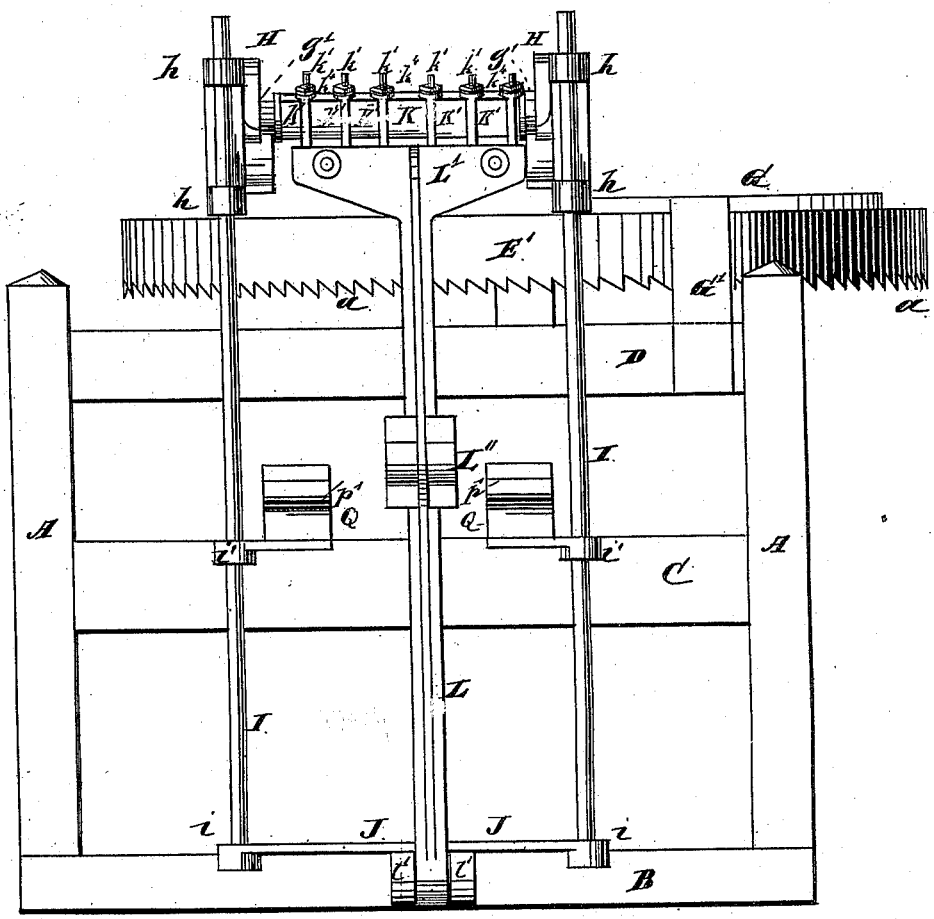
Figure 13:
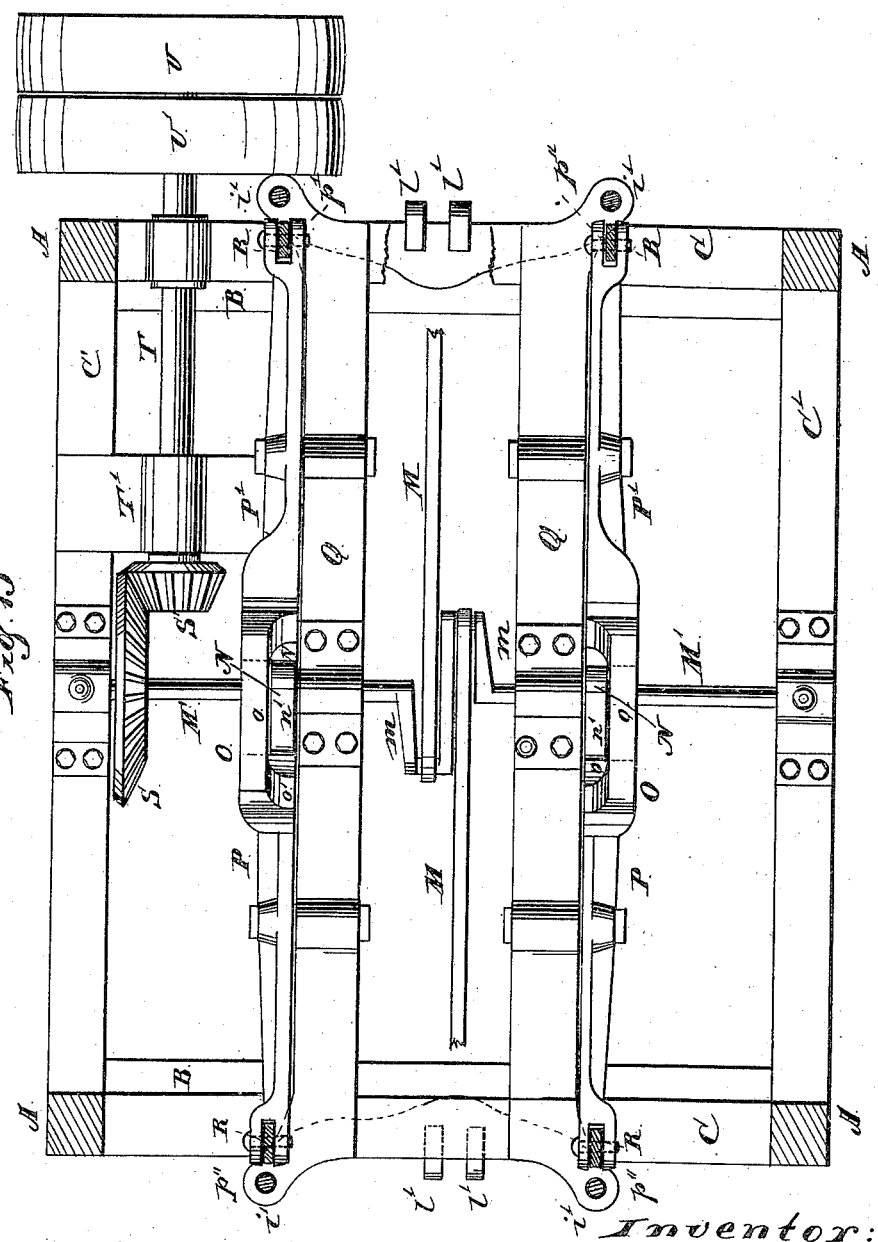

Figure 1 is a top or plan view; Fig. 2, a side elevation; Fig. 3, an end elevation; Figs. 4 and 5, details, being a top and a side view, respectively, of the stationary-bars, to which the arms or levers for operating the knife-frame are pivoted; Figs. 6, 7, and 8, details showing the arms or levers for operating the knife-frame; Figs. 9 and 10, details showing the manner of attaching the knives; Figs. 11 and 12, details of the devices for operating the pawl or dog by which the meat-carrying table is intermittently rotated; Fig. 13, a cross-section on line $x$ $x$ of Fig. 2; Figs. 14 and 15, details showing one of the cams and its stirrup.

This invention relates to certain improvements on the meat-cutting machine for which Letters Patent No. 270,319 were granted to me January 9, 1883, and has for its object to improve and perfect certain parts of such machine, as hereinafter more specifically described and pointed out; and its nature consists in the several devices and combinations of devices hereinafter set forth, and specifically pointed out in the claims.

In the drawings, A represents corner posts or uprights, of wood or any suitable material; B, the bottom rails or pieces, one on each end of the frame; C, side rails, and C' end rails; D, top side rails, and D' top end rails. These parts A, B, C, C', D, and D' constitute a frame-work for supporting the other devices, and such frame-work may be of the form shown or of other form suitable to furnish a support for the other devices.

E is a cutting table or bottom, of iron or other suitable material, of a circular form, as shown, and having around its periphery a rim, which projects sufficiently above the upper surface of the table to form a guard to hold the contents of the table thereon when subjected to the cutting action. This rim E' projects somewhat below the under face of the table, and is provided with notches or teeth $a$, with which the end of a pawl or dog, $b$, engages, the pawl or dog being thrown and held into engagement, as shown, by a spring, $b'$; but other devices or means can be used for holding the pawl to its work. This pawl is pivotally attached to the end of an arm, $c$, which arm is secured to a shaft, $d$, which shaft passes through the top piece, D', on one side of the machine, and, as shown, is supported and held by such side piece and a support, $d'$, attached to the under side of the cross-piece and having ears $d''$, in which the shaft $d$ has its bearings. The end of the shaft projecting inside of the piece D' has attached thereto an arm, $e$, in which is a slot, $e'$, which slot receives a pin on a rod, $f$, and this rod $f$ is socketed in a ring, $f'$, encircling an eccentric, $f''$, mounted on the crank-shaft, so that as the shaft is rotated the eccentric $f''$ will operate the arm $e$ through the rod $f$ and ring $f'$, and this arm will rock the shaft $d$, moving the arm $c$, and giving the pawl $b$ the required forward and backward movement to intermittently move the cutting-table E.

F is a central pivot carrying the cutting-table, which pivot may be supported on a cross-bar or on a platform. This pivot is located central of the table, so that the table will be carried thereby, and be free to have an intermittent rotation given to it by the pawl $b$ or other moving device; but the pivot F is not located central with the frame-work, but at one side, so that when the table is in position it will overhang to one side of the frame, as shown in Fig. 1, the extent of the overhanging being sufficient to bring the center of the table on one side outside of the line of cut; and the object of thus hanging the table is to leave a clear space for the crowding to one side of the meat while in the process of being cut and prevent the meat from crowding or being compacted beneath the knives and thereby interfere with the cutting operation.

G represents scrapers or clearers located to come within the interior of the rim E' and in close proximity to the upper face of the cutting table or bottom E. These cleaners are each supported by a standard, G', secured to some part of the framing, and so arranged as to bring one end of each scraper in contact, or nearly so, with the interior of the rim, while the other end projects inward, as shown in Fig. 1, and, as shown, one of these scrapers is of a curved form to work against the travel of the table and the other is straight, and their object is to prevent the meat from accumulating around the edge or periphery where it would not be acted upon by the knives or cutters.

H represents guide-bars, of iron or other suitable material, each of which is provided with curved slots $g$, which slots are formed as shown in Fig. 2, and, as shown, each end of each bar H is provided with loops $h$, which form guides to maintain the bars in a vertical line of travel in raising and lowering the cutters.

I represents guide-rods, two at each end of the machine, and so arranged as to receive the eyes or loops $h$ at the end of the respective guide-bars H, and form a support on which the side bars can slide up and down. As shown, the guide-rods I are each held in place by rings or collars $i\ i'$, one at the bottom and one higher up on the frame. (See Figs. 2 and 3.)

J represents plates or castings, one of which is secured to the top of each bottom piece B, and having at the center, in the form of construction shown, depending ears $l'$, between which is an opening for the lower end of swinging levers, and, as shown, the sockets or rings for the lower end of the guide-rods I are also formed on the casting or plate J. (See Fig. 3.)

K represents cross-heads, one for each set of slots $g$ in the side bars, H, each head having on its ends rollers $g'$, which enter the slots in the side bars. These cross-heads K carry the double series of knives or cutters, each knife K'' having a shank or bar, K', to which it is secured, which bars are each attached to one or the other of the cross-heads by a bolt, $k'$, the head of which enters a recess in the cross-head, as shown in Fig. 9. The stem of the bolt passes up through a cover or piece, $k''$, on top of the cross-head, and through the knife-shank K', and around the stem of the bolt, between its head and the plate $k''$, in the socket $k$, is a coiled spring, $k^3$, which allows a slight yield of the knife or blade in case of striking any hard substance that might break or injure it, and, as shown, the degree of yield is regulated by a set-nut, $k^5$, and a jam-nut, $k^6$, between which and a securing-nut, $k^4$, the shank of the knife is located, so as to leave a small space between the under face of the shank and the set and jam nuts, which allows of the nuts being adjusted for the adjustment of the spring $k^3$. The rear end of each shank or bar K' is formed with a hook, K³, by means of which and a rod, K⁴, the shanks are attached to the cross-heads of the operating-levers.

L represents the operating levers, one on each end of the machine, and each carrying at its upper end a cross-head, L', in which is a series of slots, $l$, of sufficient size to receive the hooked ends K³ of the knife-shanks, and through this slotted portion is formed a hole for the passage of the rod K⁴, so that by slipping the rod into position the hooked ends of the shanks can be slipped beneath the rod and in the respective slots therefor, thus attaching the knives to the cross-head and operating-lever. The slots in the cross-head are so arranged in relation to each other as to bring the knives on one side in line with the spaces between the knives on the opposite side, so that the knives can pass each other free and clear when in operation, as shown in Fig. 1. The lower end of each lever L is pivotally secured between the ears $l'$, and the pivotal point of each lever is in such relation to the frame as that when the knives are thrown forward to the limit of the movement the levers will stand vertical, or nearly so.

M represents pitmen, one for each lever L, and pivotally attached to the lever at L''. Each pitman at its other end is connected to a crank, $m$, on a shaft, M', which shaft has a rotary motion given thereto, rotating the cranks, and through the pitmen giving the levers a swinging movement by which the knives or cutters are carried forward and back over the cutting-table.

N represents cams located on the shaft M' and secured thereto in any firm manner, so as to be revolved therewith, a cam being located on each side of the respective cranks $m$. Each cam is composed of two portions, $n\ n'$, each of which is in the form of an ellipse, the length of the portion $n'$ in its longest direction being equal to the width of the portion $n$, and each cam is set on the shaft to have the distance from the center of the shaft to the ends of the longer portion the same as the distance to the ends of the portion $n'$.

O represents stirrups, one for each cam N, and encircling such cams. Each stirrup is formed of a top bar, $o$, bottom bar, $o'$, and end bars, $o''$, the end bars having curved interior faces, and the top and bottom bars straight interior faces, the width of the interior openings from end bar to end bar being equal to the length of the cam in the longest direction, so as to allow the periphery of the portion $n$ to run clear, and these end bars, $o''$, are curved so as to bring the top and bottom bars out of a vertical line and in such relation to each other as to have their inner sides in line, or nearly so, by which arrangement the periphery of the portion $n$ of the cam will engage the inner face of the bar $o$, but clear the bar $o'$, while the periphery of the portion $n'$ will engage the interior face of the bar $o'$, but clear the bar $o$, the result being that the portion $n$ will act to raise the stirrup O and the portion $n'$ will act to depress the stirrup, and the relation of the cam N to the stirrup O is one which keeps the cam and stirrup always in engagement, so that there can be no sudden movement of the stirrup either up or down, but the movement must be a gradual one.

P P' are arms or levers to coact with the cams and stirrups. The stirrup O is secured to the inner end of the arm or lever P, as shown in Fig. 6, and the inner end of the arm or lever P' has a head, P", in which is a depression, $p^3$, to engage with the exterior face of the upper end bar, $o''$, as shown in Figs. 6 and 8, and the extreme end $P^3$ of this head P" is forked, as shown in Fig. 8, to receive the end of a link, $p^4$, which is pivotally attached to the fork, the other end being pivotally attached in a slot in the inner end of the arm or lever P, as shown in Fig. 6, by means of which the arms or levers P P' will move together.

Q represents supporting-bars, one located on each side of the cranks $m$, adjacent to the arms or levers P P', and in such relation to such arms or levers as to have the respective arm or lever pivoted to the bar Q, the arms or levers having openings $p$ and the bar Q openings $p'$ for the passage of the bolt or pivot. As shown, the ends of the bars Q are turned to one side and form the collars $i'$, which support the guide-rods I, and, as shown, the outer end of each arm or lever P P' is provided with a fork, $p''$.

R represents links, one for each arm or lever P P', and pivotally connected to its arm or lever in the fork $p''$ at its lower end, its upper end being pivotally connected to an ear, $r$, on the lower corner of the bar H, as shown in Fig. 2, by which means the arms or levers P P' are connected with the bars H, so that as the arms or levers are operated through the cams N and stirrups O the bars H will be raised and lowered.

S is a beveled wheel secured to the shaft M' and engaging with a beveled pinion, S'.

T is a shaft mounted in a bearing, T', extending out from the side piece, C', and a bearing on the end piece, C, which shaft carries the pinion S'.

U is a driving-pulley on the end of the shaft T, and U' a loose pulley on shaft T, the driving-pulley receiving a belt by which power is applied to operate the machine; but in place of such pulley other forms of driving devices could be used.

The meat or other material to be cut is placed on the table E, and power is applied to the pulley U, and through the shaft T and cog-wheels S S' is communicated to the shaft M', rotating such shaft, and driving the cranks $m$ to reciprocate the pitmen or connecting rods M, and through such rods oscillate the levers L. The forward movement of the levers L carries the knives connected with the respective levers to the outer edge of the table, through the travel of the rollers $g'$ in the slots $g$ and the movement of the heads L', to which the knives are connected, and the backward movement of the levers L draws the knives inward over the table, cutting the material on the table with a draw cut by reason of the draw given to the knives through the movement imparted to them from the levers. The rotation of the shaft M' also rotates the cams N, which cams are located on the shaft, one on each side of the cranks $m$, the cranks being located at or near the center of the shaft longitudinally. The cams are located on the shaft M' in such relation to the cranks that on the inward movement of the levers L the portion $n'$ of the cams will run in contact with the bar $o'$ of the stirrup O, pressing down the inner ends of the levers P P' and throwing up the outer ends of such levers, which movement through the connecting-links R elevates the guide-bars H, holding the knives clear of the table and the material thereon while being carried into position to the outer edge or periphery of the table, so that such movement of the knives will not act on or displace the material. As the knives reach the limit of their outward movement and the levers the limit of their inward movement, the section $n'$ of the cam N leaves the bar or track $o'$, and the section $n$ comes into engagement with the bar or track $o$, forcing the inner ends of the levers P P' up, and throwing down the outer ends of such levers, which movement draws down the links R and with them the guide-bars H, bringing the knives down in position to be drawn across the table and perform the cutting, and this movement occurs as the cranks $m$ come into position to carry the levers L backward, so that during such backward movement of the levers the knives will be held firmly down and across the table. The eccentric $f''$ is located on the shaft M', and its location in relation to the cranks is one that will cause the pawl $b$ to be withdrawn as the levers L are carried backward to be thrown into engagement with a notch, $a$, and move the table around as the knives complete their inward movement and are elevated to clear the material, so that as the knives are clear of the material the pawl $b$ acts and carries the table around to bring the material thereon in relation to the knives to have the knives enter at a new point to act on the material, and the amount of movement given to the table at each operation of the pawl depends on the length of stroke which the pawl has, and the length of stroke can be varied as may be desired by lengthening or shortening the link or connecting rod $f$. The eccentric is non-acting for a portion of its rotation by the travel of the pin on the rod $f$ in the slot $e'$ of the arm or lever $e$. The slots $g$ in the guide-bars H are curved to correspond to the arc of the circle described by the upper end of the levers L, and the rollers $g'$, which carry and support the knives traveling in the slots, maintain the knives in a horizontal plane in traveling over the material, the result being that the knives cut from the time that they enter the material until they pass therefrom, thus insuring a reliable and positive operation; and as the knives have an inclined position from their points to their heels when in use it will be evident that the cut will be a draw one. The levers L standing vertical, or nearly so, as the knives drop for cutting purposes it will be seen that their upper ends stand in the highest plane, or nearly so, which is described in the movement of the levers, and that as the levers return this upper end descends gradually to a lower plane, but at no time attains a higher one than that at which the knives are brought into use, the result being that the movement of the knives will be in a plane parallel with the table from the time they enter until they pass from the material, and by using the lifting-levers P P' in connection with the double cam N and stirrup O on each side the guide bars will be raised and maintained in an elevated position while the knives are being advanced, and will be dropped without any sudden jar and held while the knives are doing their work. The levers L are pivoted at the lower ends at a point in line with or slightly in advance of the point which their upper ends occupy when the limit of the forward movement is reached, so that such upper end will gradually descend during their entire movement. By securing the knives to the head L' through the connecting-rod and hooks the rollers $g'$ can be withdrawn from the slots $g$, and the entire series of knives can be lifted as a whole and removed from the frame, and by loosening the attaching-bolts $k'$ of any one knife such knife can be readily withdrawn without disturbing the remaining knives.

What I claim as new, and desire to secure by Letters Patent, is—

1. The combination of the shaft M', the cams N thereon, the stirrups O, encircling the cams, the levers P P', pivoted intermediate their ends and acted on at their adjacent extremities by the lower part of the stirrups, the vertically-movable guide-bars H, and a link-connection between the pivoted levers and the guide-bars, substantially as described.

2. The combination of the machine-frame, the vertical guide-rods I, the guide-bars H, having loops $h$, loosely engaging the rods, the links R, connected with the bars, the levers P P', pivoted intermediate their ends and connected with the links, the stirrups O, acting on the adjacent ends of the levers, the cams N, inclosed by stirrups, and the shaft M', substantially as described.

3. The combination of the shaft M', the cams N, composed of two parts, $n$ $n'$, and the stirrups O, encircling the cams and composed of the straight-faced top and bottom bars, $o$ $o'$, and the curved-faced end bars, $o''$ $o'''$, with the levers P P', pivoted intermediate their ends and acted on at their adjacent extremities by the lower bars of the stirrups, the links R, connected with the levers, and the guide-bars H, connected with the links, substantially as described.

4. The combination of the pivoted lever P, the stirrup O, attached to said lever, the pivoted lever P', having a head provided with the depression $p^3$, in which a part of the stirrup is seated, a pivotal connection between the adjacent ends of the levers, the cams N, inclosed by the stirrups, the shaft M', the guide-bars, and connections between the latter and the levers, substantially as described.

5. The combination of the levers L, pivoted at their lower ends and provided at their upper ends with heads L', having slots $l$, the detachable rod $K^4$, and the knife-shanks having hooked ends $K^3$ engaging the rod, substantially as described.

6. The cams N, stirrups O, arms or levers P P', link $p^4$, and links R, in combination with the guide-bars carrying knives, substantially as and for the purpose specified.

7. The cams N, stirrups O, arms or levers P P', link $p^4$, and links R, in combination with the bars H, carrying the knife-frames, and guide-rods I, substantially as and for the purpose specified.

8. The pawl $b$, arm $c$, shaft $d$, slotted arm $e$, rod $f$, ring $f'$, and eccentric $f''$, in combination with a cutting-table, E, having ratchet-teeth $a$, for giving the table an intermittent rotary movement, substantially as and for the purpose specified.

FERDINAND LINDNER.

Witnesses:
  ALBERT H. ADAMS,
  O. W. BOND.